(12) United States Patent
Valentine et al.

(10) Patent No.: US 9,410,834 B2
(45) Date of Patent: Aug. 9, 2016

(54) SYSTEM AND METHOD FOR PROVIDING A SELF VALIDATING MASS FLOW CONTROLLER OR A MASS FLOW METER UTILIZING A SOFTWARE PROTOCOL

(71) Applicant: Illinois Tool Works Inc., Glenview, IL (US)

(72) Inventors: Bill Valentine, Glenview, IL (US); Chris Ellec, Glenview, IL (US); Berwin Banares, Glenview, IL (US); John Lull, Glenview, IL (US); Anthony Kehoe, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 82 days.

(21) Appl. No.: 14/378,556

(22) PCT Filed: Mar. 4, 2013

(86) PCT No.: PCT/US2013/028907
§ 371 (c)(1),
(2) Date: Aug. 13, 2014

(87) PCT Pub. No.: WO2013/134144
PCT Pub. Date: Sep. 12, 2013

(65) Prior Publication Data
US 2015/0122054 A1      May 7, 2015

Related U.S. Application Data

(60) Provisional application No. 61/607,949, filed on Mar. 7, 2012.

(51) Int. Cl.
*G01F 1/80* (2006.01)
*G01F 1/74* (2006.01)
*G01F 25/00* (2006.01)
*G01F 1/34* (2006.01)

(52) U.S. Cl.
CPC .. *G01F 1/74* (2013.01); *G01F 1/34* (2013.01); *G01F 25/0007* (2013.01)

(58) Field of Classification Search
CPC ............... F16K 3/36; G01F 1/00; G01F 1/12
USPC ............ 73/861; 137/486, 487.5; 702/47, 100
See application file for complete search history.

(56) References Cited

U.S. PATENT DOCUMENTS

| | | |
|---|---|---|
| 4,285,245 A | 8/1981 | Kennedy |
| 5,062,446 A | 11/1991 | Anderson |
| 7,881,886 B1 | 2/2011 | Shareef et al. |
| 2006/0011237 A1 | 1/2006 | Tison et al. |
| 2011/0022334 A1* | 1/2011 | Ding ........................ G01F 5/00 702/47 |
| 2015/0007897 A1* | 1/2015 | Valentine ............ G01F 25/0007 137/487.5 |

OTHER PUBLICATIONS

International Search Report and Written Opinion date mailed Apr. 25, 2013 for International PCT Application PCT/US2013/028907.

* cited by examiner

*Primary Examiner* — Jewel V Thompson
(74) *Attorney, Agent, or Firm* — McGuireWoods, LLP

(57) ABSTRACT

The disclosed embodiments include a method, apparatus, and computer program product for verifying a performance of a mass flow controller or mass flow meter on a tool. For example, the disclosed embodiments include a method and a mass flow controller configured to perform, in-situ, by the mass flow controller, a rate of decay measurement during on-line operation of the tool to identify valve leak issues and/or for performing a flow measurement.

20 Claims, 4 Drawing Sheets

SYSTEM AND METHOD FOR PROVIDING A SELF VALIDATING MASS FLOW CONTROLLER OR A MASS FLOW METER UTILIZING A SOFTWARE PROTOCOL

BACKGROUND OF THE INVENTION

1. Field of the Invention

The present invention relates generally to methods and systems for determining the mass flow rate of a fluid, and more particularly to the operation of mass flow controllers.

2. Discussion of the Related Art

Many industrial processes require precise control of various process fluids. For example, in the semiconductor industries, mass flow controllers (MFCs) are used to precisely measure and control the amount of a process fluid that is introduced to a process chamber. It is to be understood that the term fluid as used herein applies to any type of gas or vapor to which controlled flow may be of interest.

MFCs have well defined performance criteria that are guaranteed by the MFC suppliers. Customer processes are based on repeatable performances from the devices after initial installation and process tune up. MFCs that drift (e.g. due to aging) or get clogged (e.g. due to contamination) will cause a loss of repeatability that causes the process characteristics to change and will lead to lower yield or even total loss of the product being manufactured.

One typical implementation to detect this loss of performance is to make Rate of Decay (ROD) measurement while the MFC is flowing at a given setpoint to verify that the device characteristics have not changed. Starting a ROD measurement is done by interrupting the gas supply upstream of the pressure sensor and letting the pressure decay. Actual flow is directly proportional to the slope of the pressure decay. This process is currently performed off-line, meaning it requires the tool (i.e., the device utilizing the MFC) to stop processing wafers while the test is running. Since this impacts the customer's profits, it is not done very often, which could lead to running a process with low yield for an extended period of time.

To combat one or more of these problems, the disclosed embodiments include a system and method for providing a self-validating mass flow controller utilizing a software protocol without requiring a separate device to be installed on the tool. In other words, the disclosed embodiments provide a mass flow controller that is configured to make the ROD measurement within the device without requiring changes to the tool plumbing or hardware. This will enable the MFC to provide real time information without requiring down time to make the measurements.

BRIEF SUMMARY OF THE INVENTION

The disclosed embodiments include a method, apparatus, and computer program product for verifying a performance of a mass flow controller or a mass flow meter on a tool. For example, the disclosed embodiments include a method and an apparatus configured to perform, in-situ, a rate of decay measurement during on-line operation of the tool to identify valve leak issues or for performing a flow measurement.

For example, in one embodiment, the disclosed embodiments include a mass flow controller for controlling a flow of a fluid, the mass flow controller includes an inlet for receiving the fluid; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; a communication interface for communicating with a tool controller; and at least one processing component configured to execute instructions to perform an in-situ rate of decay measurement.

Similarly, the disclosed embodiments include a mass flow meter that includes an inlet for receiving the fluid; a flow path in which the fluid passes through the mass flow controller; a mass flow sensor for providing a signal corresponding to mass flow of the fluid through the flow path; a communication interface for communicating with a tool controller; and at least one processing component configured to execute instructions to perform an in-situ rate of decay measurement.

Advantages of the disclosed embodiments include, but are not limited to, a system and method for providing a self-validating mass flow controller or mass flow meter that uses one or more processors to execute instructions associated with one or more software protocols to eliminate the requirement of having a separate device installed on a tool to perform the rate of decay measurement and/or for requiring that the rate of decay measurement be performed off-line. In addition, the disclosed embodiments do not require any hardware or mechanical changes to an existing mass flow controller or tool.

Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for providing a self-validating mass flow controller utilizing a software protocol without requiring a separate device to be installed on the tool and without requiring a tool that is using the mass flow controller to go off-line.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
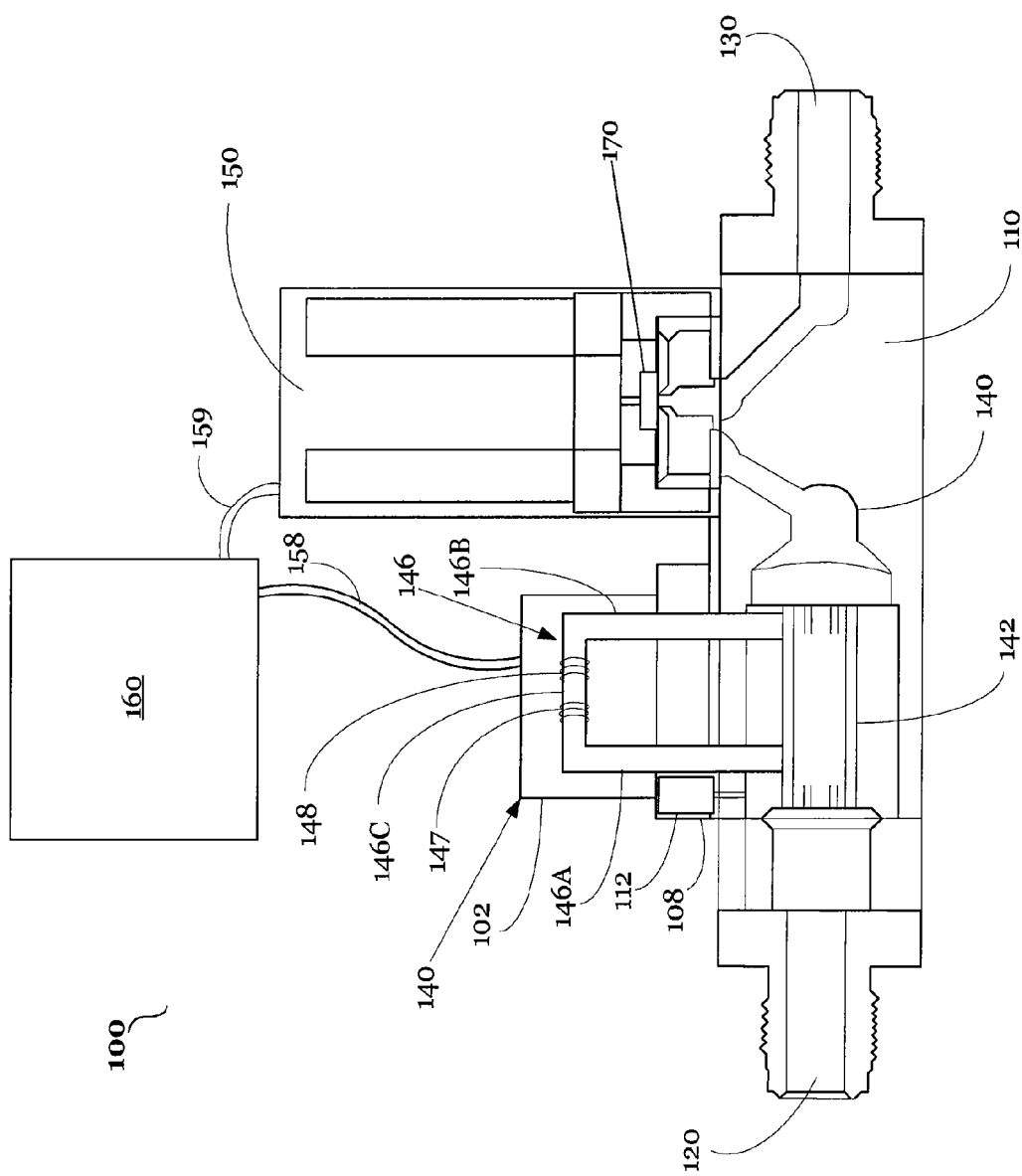
FIG. 1 illustrates components of a mass flow controller in accordance with the disclosed embodiments.

FIG. 1 shows schematically a typical mass flow controller 100 that includes a step 110, which is the platform on which the components of the MFC are mounted. A thermal mass flow meter 140 and a valve assembly 150 containing a valve 170 are mounted on the step 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147, 148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147, 148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a rate of decay measurement.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control may be used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied using electrical conductors 159 to the control valve assembly 150 to modify the flow. To this end, the controller 160 compares the signal from the mass flow sensor 140 to predetermined values and adjusts the proportional valve 170 accordingly to achieve the desired flow.

Although FIG. 1 depicts that the mass flow controller 100 includes a thermal mass flow sensor, the mass flow controller 100, in accordance with the disclosed embodiments, may utilize other types of mass flow sensors including a Coriolis type sensor. An advantage of using a Coriolis-based sensor is that it is capable of determining mass flow independent of temperature, flow profile, density, viscosity, and homogeneity.

Figure 2:
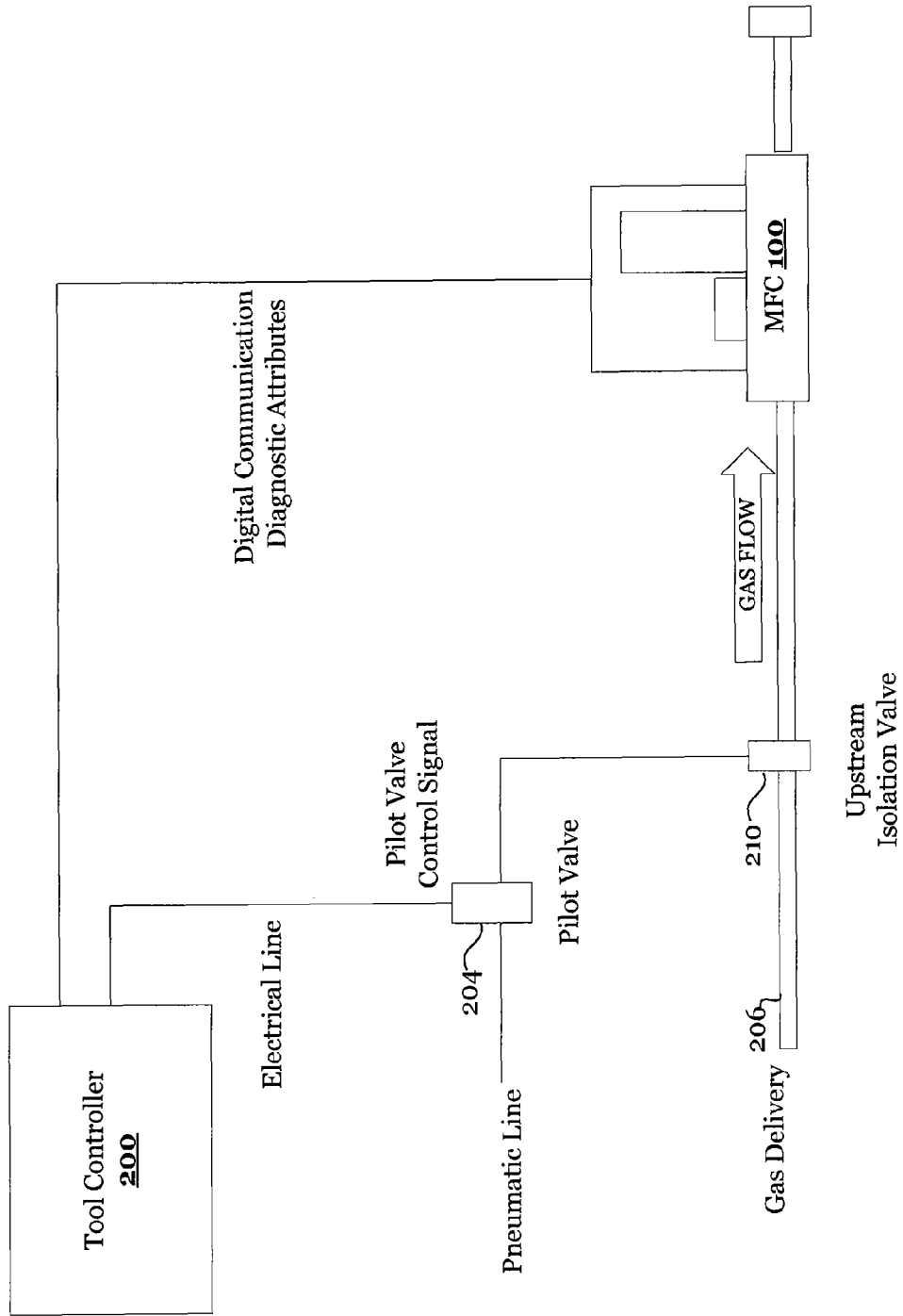
FIG. 2 illustrates an example of an environment in which a mass flow controller or mass flow meter communicates with a tool controller in accordance with a disclosed embodiment.

FIG. 2 illustrates a block diagram depicting an embodiment for providing a self-validating mass flow controller in accordance with the disclosed embodiments. As illustrated in the depicted embodiment, the mass flow controller 100 is installed on a tool that includes a tool controller 200 that controls delivery of gas to the mass flow controller via a gas delivery line 206. An isolation valve 210 is located upstream of the mass flow controller 100 on the gas delivery line 206. The isolation valve 210 is communicatively coupled to a pilot valve 204, which is controlled by the tool controller 200. The isolation valve 210 is typically a normally closed valve. When the tool pilot valve 204 is open, compressed air actuates the isolation valve 210 to open. When the tool pilot valve 204 is closed, no air is supplied, causing the isolation valve 210 to close, thereby shutting the gas supply to the mass flow controller 100.

Therefore, in accordance with the disclosed embodiments, in order to interrupt the delivery of gas to the mass flow controller 100, the mass flow controller 100 may be configured with a software protocol to communicate with the tool controller 200 to have the tool controller issue a pilot valve control signal to close the tool pilot valve 204, which in turn causes the upstream isolation valve 210 to close, thereby shutting the gas supply to the mass flow controller 100 for enabling the mass flow controller 100 to perform an in-situ rate of decay measurement for self-detecting any performance loss.

Figure 3:
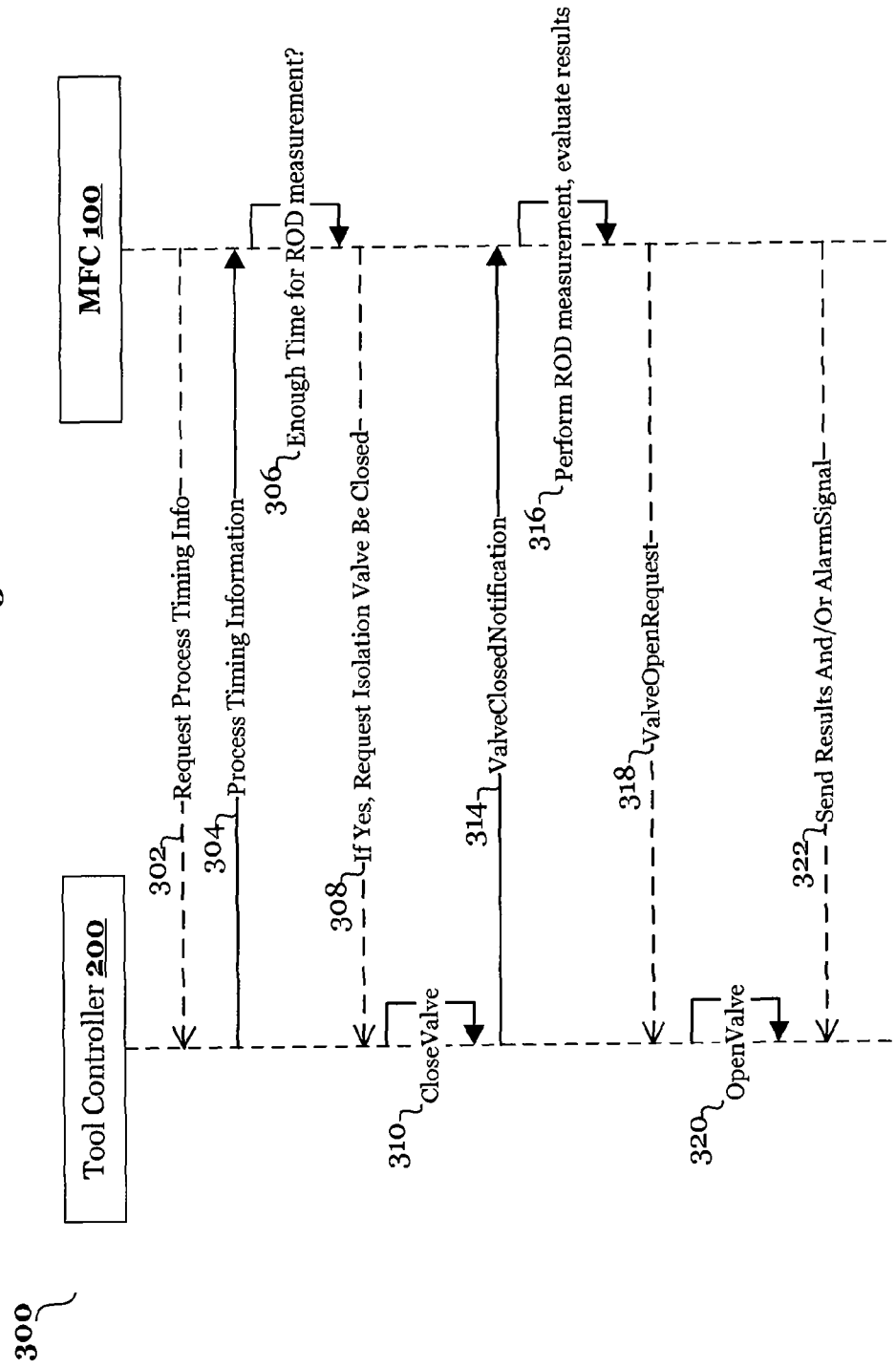
FIG. 3 illustrates an example of a sequence diagram depicting a software protocol for performing a rate of decay measurement in accordance with one embodiment.

For example, FIG. 3 illustrates a sequence diagram 300 depicting a software protocol 300 for performing a rate of decay measurement in accordance with the disclosed embodiment. For instance, the process 300 may be configured to perform a rate of decay measurement to determine a flow measurement during a setpoint. Alternatively, the process 300 may be configured to perform a rate of decay measurement to perform a valve leak measurement after the setpoint goes back to zero. The software protocol 300 may be implemented in a controller or control electronics of a mass flow controller as described in FIG. 1. For example, the software protocol may be executed using one or more processors of the mass flow controller.

In the depicted embodiment, the mass flow controller 100 requests process timing information from the tool controller 200 (step 302). This request may be performed at a predetermined time and/or occur repeatedly at prespecified time intervals. In one embodiment, the process timing information may include upcoming setpoint value(s) and duration(s), i.e., a recipe/tool process schedule for a subsequent period of time, including zero setpoint. In response to the process timing information request, the tool controller 200 returns the process timing information data to the mass flow controller 100 (step 304). In an alternative embodiment, the tool controller 200 may be configured to automatically push the process timing information data to the mass flow controller 100 without having to first receive a request.

Using the process timing information, the mass flow controller 100 identifies processing time intervals in which the mass flow controller 100 is able to complete a rate of decay measurement (step 306). For example, the mass flow controller 100 may be configured to execute pattern recognition instructions to recognize certain patterns in the processing time information that enables the mass flow controller 100 to identify certain process time intervals in which a rate of decay measurement may be completed without interruptions. The mass flow controller may execute an algorithm for determining a time needed to complete a rate of decay measurement using such factors as a type of gas and setpoint being applied to the mass flow controller.

In response to identifying a processing time interval in which the mass flow controller 100 is able to complete a rate of decay measurement, the mass flow controller 100 issues a request to the tool controller 200 to close the isolation valve 210 (step 308). The tool controller 200 issues a pilot valve control signal to close the tool pilot valve 204, which in turn causes the upstream isolation valve 210 to close (step 310). The tool controller 200 then transmits a status acknowledgement to the mass flow controller 100 indicating that the isolation valve is closed (step 314). The mass flow controller 100 initiates and evaluates the results of a rate of decay measurement (step 316). After performing the rate of decay measurement and verifying the results, the mass flow controller 100 transmits a request to the tool controller 200 to re-open the isolation valve (step 318). In certain embodiments, the mass flow controller 100 may also transmit the results to the tool controller 200 and/or may be configured to raise an alarm when its internal rate of decay measurement shows that the characteristics of the device have changed by a certain amount in a given period of time (step 322). For example, the accuracy at a given setpoint has shifted by more than 2% over a 2 week period. In an alternative embodiment, the sending of the results and/or the signal may replace the need for sending a valve reopening request (i.e., step 318). Still, in another embodiment, the request performed at step 308 may contain the necessary valve closure duration and the tool can automatically re-open the valve after such duration.

Figure 4:
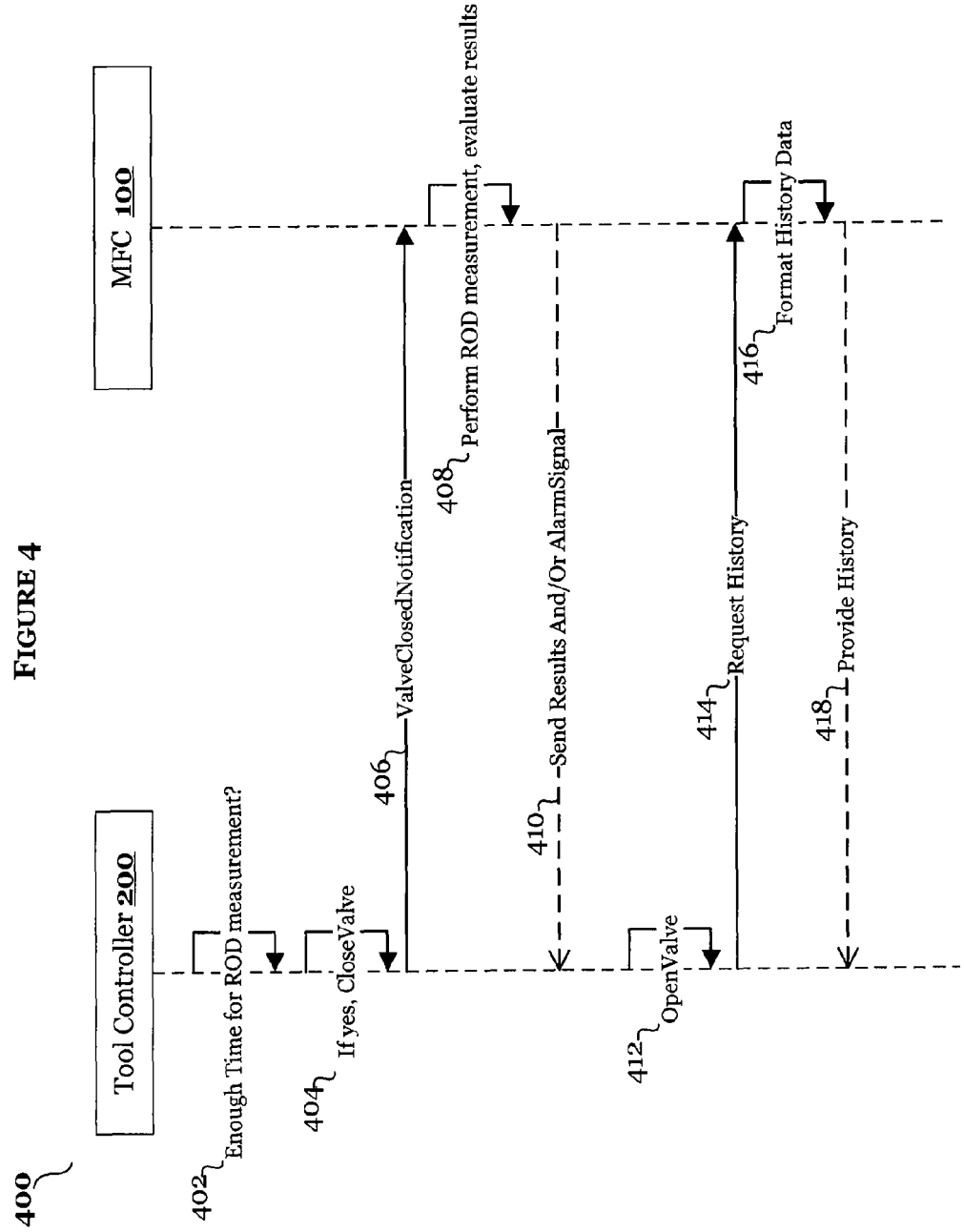
FIG. 4 illustrates an example of a sequence diagram depicting a second software protocol for performing a rate of decay measurement in accordance with another embodiment.

FIG. 4 illustrates another example of a software protocol between the mass flow controller 100 and the tool controller 200 for making a rate of decay measurement in accordance with the disclosed embodiments. As stated above, the rate of decay measurement may be utilized for performing a flow measurement or for determining valve leak. In this embodiment, the tool controller 200 could be configured to execute instructions to identify processing time intervals in which the mass flow controller 100 is able to complete a rate of decay measurement (step 402). In response to identifying a processing time interval in which the mass flow controller 100 is able to complete a rate of decay measurement, the tool controller 200 may simply initiate the gas supply interruption by causing the upstream isolation valve 210 to close (step 404). The tool controller 200 then informs the mass flow controller 100 the status of the isolation valve 210 (step 406). In response to receiving the isolation valve status, the mass flow controller 100 performs and evaluates the results of a rate of decay measurement (step 408). In this embodiment, after evaluating the results, the mass flow controller 100 sends the results of the rate of decay measurement and/or an alarm signal to the tool controller 200 indicating the mass flow controller 100 is done performing the rate of decay measurement (step 410). Based on the received results, the tool controller 200 may then issue a signal to re-open the isolation valve 210 (step 412).

In addition, in certain embodiments, the tool controller 200 may also request history information from the mass flow controller 100 (step 414). The mass flow controller 100 responds by formatting the history data (step 416) and providing the history data to the tool controller 200 (step 418). Although the history request is illustrated in process 400, the history request may also be performed in relation to process 300. Further, the history requests may be performed independently of process 300 and/or process 400. In other words, the tool controller may at any time request history data from the mass flow controller without first performing a rate of decay measurement. Additionally, certain steps described above in regard to process 300 may be performed in process 400, and vice versa.

Accordingly, as described above, advantages of the disclosed embodiments include, but are not limited to, a system and method for providing a self-validating mass flow controller that uses one or more processors to execute instructions associated with one or more software protocols to eliminate the requirement of having a separate device installed on the tool to perform the rate of decay measurement for checking valve leak and/or for requiring that the rate of decay measurement be performed off-line. In addition, the disclosed embodiments do not require any hardware or mechanical changes to an existing mass flow controller.

While the above described figures discloses various embodiments of a mass flow controller, the above disclosed modifications may similarly be made to a mass flow meter for enabling a self-validating mass flow meter that is operable to communicate with the tool controller 200 to initiate a rate of decay measurement for determining a flow rate and/or for determining valve leak. The primary difference between the disclosed mass flow controllers and a mass flow meter is that the mass flow meter does not include a controller that operates to adjust the valve to achieve a desired flow rate as is the case with a mass flow controller. The scope of the appended claims is intended to cover mass flow meters as well as mass flow controllers and any other similar flow measuring/controlling devices.

While specific details about the above embodiments have been described, the above hardware and software descriptions are intended merely as example embodiments and are not intended to limit the structure or implementation of the disclosed embodiments.

In addition, as outlined above, certain aspects of the disclosed embodiments may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowcharts, sequence diagrams, and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two sequences shown in succession may, in fact, be executed substantially concurrently, or the sequences may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. An apparatus selected from a group consisting of a mass flow controller and a mass flow meter, the apparatus comprising:
    an inlet for receiving the fluid;
    a flow path in which the fluid passes through the apparatus;
    a mass flow sensor for providing a signal corresponding to mass flow of the fluid through the flow path;
    a pressure transducer coupled to the flow path configured to measure pressure at a point in the flow path;
    a communication interface for communicating with a tool controller; and
    at least one processing component configured to execute instructions to perform an in-situ rate of decay measurement.

2. The apparatus of claim 1, wherein the at least one processing component is further configured to execute instructions to receive process timing information from the tool controller, and identify from process timing information a time interval in which the in-situ rate of decay measurement may be completed without interruption.

3. The apparatus of claim 2, wherein the at least one processing component is further configured to execute instructions to request the process timing information from the tool controller at a predetermined time interval.

4. The apparatus of claim 2, wherein the at least one processing component is further configured to execute instructions to request the tool controller close an isolation valve along a gas delivery line to the apparatus for performing the in-situ rate of decay measurement.

5. The apparatus of claim 4, wherein the at least one processing component is further configured to execute instructions to receive an acknowledgment from the tool controller that the isolation is valve closed prior to performing the in-situ rate of decay measurement.

6. The apparatus of claim 4, wherein the at least one processing component is further configured to execute instructions to send a valve open request to the tool controller in response to completing the in-situ rate of decay measurement.

7. The apparatus of claim 1, wherein the at least one processing component is further configured to execute instructions to perform the in-situ rate of decay measurement in response to receiving a closed valve notification from the tool controller, wherein the tool controller determined that the in-situ rate of decay measurement may be completed without interruption.

8. The apparatus of claim 1, wherein the at least one processing component is further configured to execute instructions to notify the tool controller of a result of the in-situ rate of decay measurement.

9. The apparatus of claim 1, wherein the at least one processing component is further configured to execute instructions to raise an alarm when the rate of decay measurement shows that characteristics of the apparatus have changed by a certain amount in a given period of time.

10. The apparatus of claim 1, wherein the at least one processing component is further configured to execute instructions to receive a history request from the tool controller, format history data, and provide the formatted history data to the tool controller.

11. A method for checking a performance of an apparatus on a tool, the apparatus selected from a group consisting of a mass flow controller and a mass flow meter, the method comprising performing, in-situ, by the apparatus, a rate of decay measurement during on-line operation of the tool.

12. The method of claim 11, wherein the apparatus is further configured to execute instructions to receive process timing information from a tool controller, and identify from process timing information a time interval in which the in-situ rate of decay measurement may be completed without interruption.

13. The method of claim 12, wherein the apparatus is further configured to execute instructions to request the process timing information from the tool controller at a predetermined time interval.

14. The method of claim 12, wherein the apparatus is further configured to execute instructions to request the tool controller close an isolation valve along a gas delivery line to the apparatus for performing the in-situ rate of decay measurement.

15. The method of claim 14, wherein the apparatus is further configured to execute instructions to receive an acknowledgment from the tool controller that the isolation is valve closed prior to performing the in-situ rate of decay measurement.

16. The method of claim 14, wherein the apparatus is further configured to execute instructions to send a valve open request to the tool controller in response to completing the in-situ rate of decay measurement.

17. The method of claim 11, wherein the apparatus is further configured to execute instructions to perform the in-situ rate of decay measurement in response to receiving a closed valve notification from a tool controller, wherein the tool controller determined that the in-situ rate of decay measurement may be completed without interruption.

18. The method of claim 11, wherein the apparatus is further configured to execute instructions to notify a tool controller of a result of the in-situ rate of decay measurement.

19. The method of claim 11, wherein the apparatus is further configured to execute instructions to raise an alarm when the rate of decay measurement shows that characteristics of the apparatus have changed by a certain amount in a given period of time.

20. The method of claim 11, wherein the apparatus is further configured to execute instructions to receive a history request from a tool controller, format history data, and provide the formatted history data to the tool controller.

* * * * *